United States Patent

Grossardt et al.

(10) Patent No.: US 6,510,373 B2
(45) Date of Patent: Jan. 21, 2003

(54) METHOD AND DEVICE FOR DETECTING A LANE CHANGE

(75) Inventors: Bernd Grossardt, Boennigheim (DE); Uwe Pruhs, Boennigheim (DE); Stefan Diehle, Korntal-Muenchingen (DE); Werner Langer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 09/892,840

(22) Filed: Jun. 27, 2001

(65) Prior Publication Data

US 2002/0010536 A1 Jan. 24, 2002

(30) Foreign Application Priority Data

Jun. 30, 2000 (DE) .......................................... 100 31 128

(51) Int. Cl.[7] ................................................. B60T 8/66
(52) U.S. Cl. ......................................... 701/72; 303/169
(58) Field of Search ........................... 701/72; 303/169, 303/170, 191

(56) References Cited

U.S. PATENT DOCUMENTS

| | | | |
|---|---|---|---|
| 3,907,378 A | 9/1975 | Leiber | |
| 3,909,070 A | 9/1975 | Leiber | |
| 5,124,921 A | * 6/1992 | Jonner et al. | 303/146 |
| 5,188,432 A | * 2/1993 | Schmitt et al. | 303/147 |
| 5,315,516 A | * 5/1994 | Miller et al. | 180/197 |
| 5,494,344 A | * 2/1996 | Heyn et al. | 303/140 |
| 6,246,947 B1 | * 6/2001 | Batistic | 303/186 |
| 6,273,529 B1 | * 8/2001 | Woywod et al. | 303/139 |
| 6,295,499 B1 | * 9/2001 | Batistic | 303/167 |

FOREIGN PATENT DOCUMENTS

DE      41 40 239      6/1993

\* cited by examiner

*Primary Examiner*—Michael J. Zanelli
(74) *Attorney, Agent, or Firm*—Kenyon & Kenyon

(57) ABSTRACT

A lane change by a motor vehicle is detected in a first variant, such that a lateral-acceleration variable representing the lateral acceleration of the vehicle and/or a yaw variable representing the yaw velocity is ascertained; the change, as a function of time, of the lateral-acceleration variable and/or of the yaw variable is formed; and a lane change is detected when the change as a function of time exceeds a specifiable threshold value. A second variant provides that speed variables are determined which represent the rotations of at least two wheels; a velocity variable is ascertained representing the longitudinal vehicle velocity; the difference is determined between the speed variable of the fastest rear wheel and the velocity variable; and a curve and/or a lane change is detected when a specifiably large difference exists for a time duration of specifiable length.

12 Claims, 4 Drawing Sheets

METHOD AND DEVICE FOR DETECTING A LANE CHANGE

FIELD OF THE INVENTION

The present invention relates to a method and a device for detecting a lane change and a curve, respectively.

BACKGROUND INFORMATION

A multitude of brake-control systems, e.g. anti-lock braking systems (ABS), traction control systems (TCS) and/or electronic stability programs (ESP) are known from the related art. Thus, for example, it is known from the German Patent No. 22 43 260 (corresponding to U.S. Pat. No. 3,909,070) to jointly adjust the braking action at the wheel brakes of the wheels of one axle along the lines of preventing wheel lock. Since the wheels of one axle can be rolling on road-surface sections having very different road/tire friction coefficients, it is necessary to preselect which of the wheels to be jointly controlled predefines the joint braking action. In this connection, it is known to provide two operating modes for a joint adjustment of the braking action at both wheels of an axle. In the one operating mode, the so-called select-low-mode, the joint adjustment of the braking action, generally of the braking pressure, is effected as a function of the wheel having the lower wheel speed. In the so-called select-high-mode, the joint adjustment of the braking action, generally of the braking pressure, is effected as a function of the wheel having the greater wheel speed.

Furthermore, methods for detecting curves or for calculating lateral acceleration are known in the brake-control systems. This is done, for example, by determining a speed difference between a left and a right vehicle wheel of one or two axles on multi-track vehicles (passenger cars/trucks). For this, reference is made by way of example to the German Published Patent Application No. 41 40 239.

When cornering with high lateral acceleration, at the beginning of ABS control, thus at the beginning of the braking-pressure control for avoiding wheel lock, the control response is adapted to this cornering. During a lane change by the vehicle, however, the lateral-acceleration value calculated from the wheel-speed sensors passes through the zero crossing and changes its operational sign. If an ABS braking is started in this changeover region in which the lateral acceleration crosses zero, then the controller detects only a small lateral-acceleration value and is unable to initiate special measures for the wheel-pressure modulation during the cornering, i.e. the lane-change maneuver. Because of this, the vehicle may be under-braked during extreme lane-change maneuvers and tend toward oversteering.

SUMMARY OF THE INVENTION

An object of the present invention is to design a lane-change detection (LCC, Lane Change Control) which is used for detecting a lane change outside of and within an ABS control (pressure modulation at the wheels) with the aid of wheel-speed sensors.

According to the present invention, a lane change by a motor vehicle is detected in a first variant of the present invention, such that a lateral-acceleration variable representing the lateral acceleration of the vehicle and/or a yaw variable representing the yaw velocity is ascertained, the change as a function of time of the lateral-acceleration variable and/or of the yaw variable is formed, and a lane change is detected when the change as a function of time exceeds a specifiable threshold value.

This variant is particularly suitable for detecting a lane change when no wheel-lock control processes are present.

A second variant, preferably used when wheel-lock control processes are present, is directed toward a motor vehicle having at least two wheels arranged front and rear in the direction of travel. In this case, provision is made that speed variables are acquired which represent the rotations of at least two wheels, a velocity variable is ascertained representing the longitudinal velocity of the vehicle, the difference is determined between the speed variable of the fastest rear wheel and the velocity variable, a curve and/or a lane change is detected when a specifiable, large difference exists for a time duration of specifiable length.

Due to the reliable detection of a lane change according to the present invention, a change in the wheel-pressure modulation adapted to the lane-change situation can be carried out in the ABS controller. This leads to an increase in vehicle stability and an improvement in the instantaneous braking power during such maneuvers.

In an advantageous refinement of the first variant, speed variables are determined which represent the rotations of at least two wheels, and the lateral-acceleration variable and/or the yaw variable is ascertained as a function of the speed variables.

In an advantageous refinement of the second variant, the time duration is specified as a function of the difference, it being provided in particular that the time duration is selected to be longer in the case of a smaller difference than in the case of a larger difference.

It is also advantageous that, in reaction to a detected lane change, the braking pressure is built up more quickly at the outside wheel brake than at the inside wheel brake, and/or the braking pressure at the outside wheel brake is increased, and/or a yaw moment buildup delay, which the vehicle features within an anti-lock control device, is prevented.

In addition, according to the second variant, the braking pressure at the wheels of the rear axle is adjusted according to the select-low-control principle, according to which the braking action at both rear wheels is regulated as defined by the unstable rear wheel.

DETAILED DESCRIPTION

Figure 1:
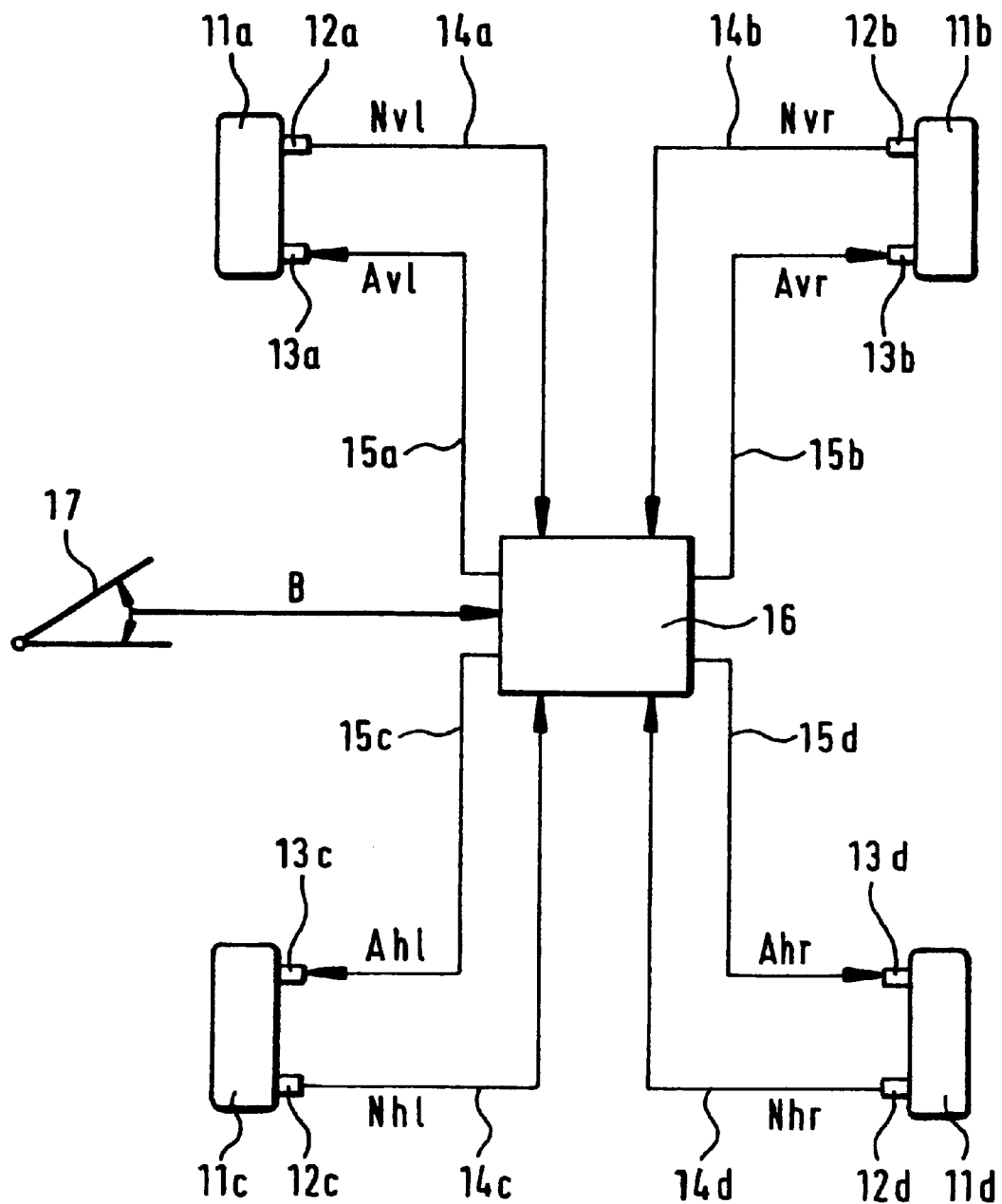
FIG. 1 shows schematically the braking system of a vehicle.

In the following, the present invention is described in light of an exemplary embodiment. Reference numerals 11a through d in FIG. 1 indicate four wheels of a two-axle vehicle, each wheel having a wheel-speed sensor denoted by reference numerals 12a through d. Wheel speeds Nij are supplied to evaluation unit 16. In this context, index i indicates whether the corresponding variable belongs to the front axle (i=v) or the rear axle (i=h). Index j represents whether the corresponding variable belongs to the right side (j=r) or the left side (j=l) of the vehicle.

Allocated to each wheel 11a through d are wheel brakes 13a through d whose braking force or braking action is controlled through lines 15a through d from evaluation unit 16. Control signals Aij are used for this purpose.

Reference numeral 17 designates the brake pedal operable by the driver. The position of brake pedal 17 is detected and supplied as signal B to evaluation unit 16.

Two mechanisms are used for detecting a lane change:
1. Lane-change detection by considering the lateral acceleration or vehicle yaw velocity outside of an ABS control (no pressure modulation at the wheels). This variant is described with reference to FIGS. 2 and 4a.
2. Lane-change detection by considering wheel-speed difference with respect to the vehicle velocity within an ABS control (pressure modulation at the wheels). This variant is described with reference to FIGS. 3 and 4b.

If a lane change is detected, then, for example, the following measures can be taken:

Rapid pressure buildup at the outside wheel which up to that point was the inside wheel.

In response to oversteering (vehicle turns onto a new course), the outside front wheels are overbraked.

Switching off a possibly incorrectly starting yaw moment buildup delay (GMA) for mu-split road surfaces (roads having different coefficients of friction on the right and left side of the vehicle). During cornering, the wheel behavior often seems very similar to braking on mu-split road surfaces. This can lead to false triggering of the GMA (yaw moment buildup delay) needed for mu-split road surfaces.

Re the first variant (lane-change detection by considering the lateral acceleration or the vehicle yaw velocity):

During a lane change, lateral-acceleration value Aq, calculated from the wheel-speed sensors, or vehicle yaw velocity Vgi passes through the zero crossing and the operational sign changes. In this case, the change characteristic dAq/dt or dVGi/dt, thus the gradient of the calculated lateral-acceleration value or of the yaw velocity is considered. This characteristic can be seen by way of example in FIG. 4a.

Figure 2:
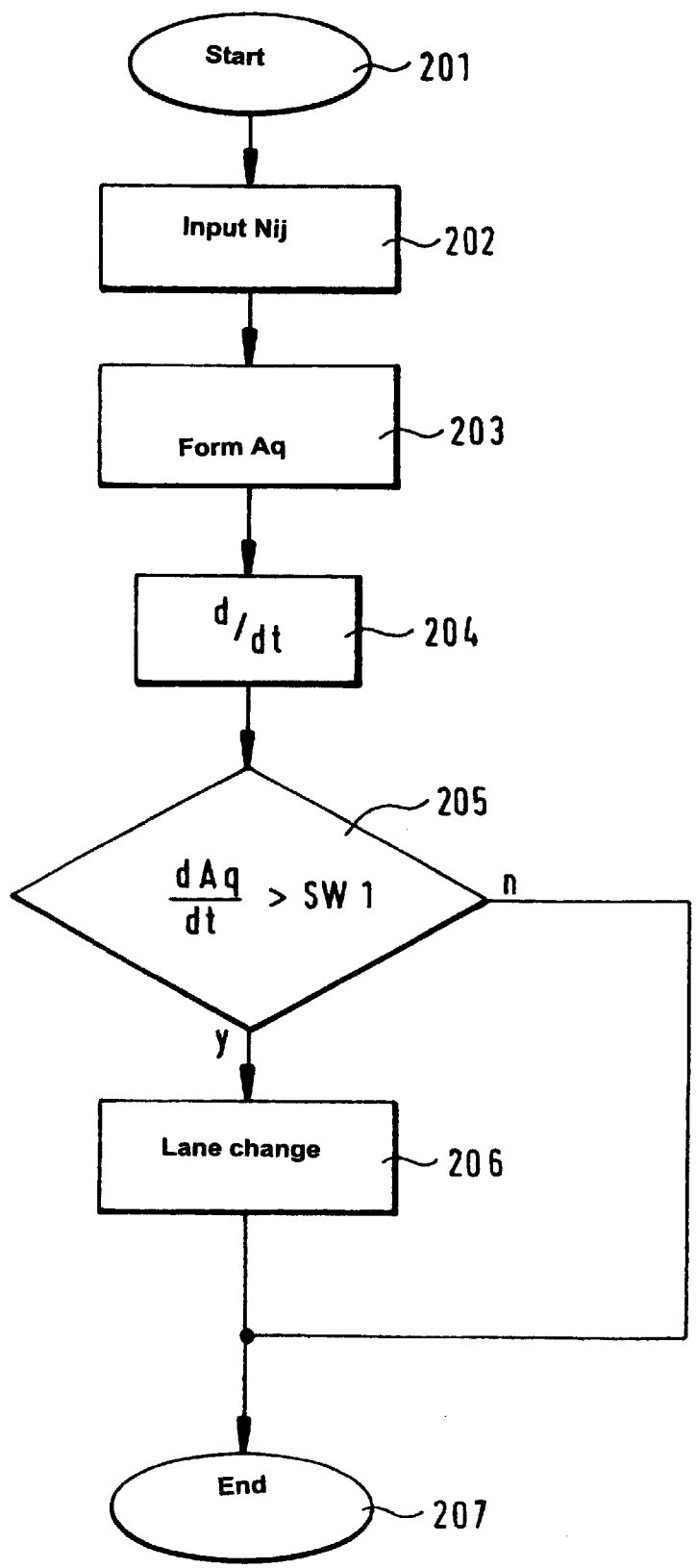
FIG. 2 shows a flow chart in accordance with the present invention.

FIG. 2 shows a functional sequence of an exemplary embodiment in which the lateral acceleration is determined from the wheel speeds. Analogous to this, it is also possible to utilize the yaw velocity for detecting lane changes.

After start step 201 in FIG. 2, wheel speeds Nij are first of all input in step 202.

Then in step 203, lateral vehicle acceleration Aq is in known manner from the wheel speeds, for example, from the difference between the speeds of the wheels on the left and on the right side of the vehicle.

In step 204, lateral vehicle acceleration Aq (or yaw velocity Vgi) is differentiated to form the time derivative dAq/dt (or dVGi/dt). The lateral-acceleration value (or the yaw velocity) as a function of time can be considered using classic differentiation dx/dt, or else on the basis of a counter observation. An evaluation using a time counter is useful when, for example, the respective programming language (e.g. assembler) offers no direct differentiation possibility.

In step 205, time derivative dAq/dt (or dVGi/dt) is compared to a threshold value Swi.

If value dAq/dt (or dVGi/dt) exceeds threshold value SWi, then in step 206, a lane change is detected and the control is adapted to this driving situation.

Sensor values (lateral-acceleration sensors and/or yaw-angle velocity sensors) or else values calculated from wheel speeds can be used for the detection.

Re the second variant (lane-change detection by considering the wheel-speed difference with respect to the vehicle velocity):

If a lateral-acceleration calculation from the wheel-speed sensors is possible within an ABS control, then the same procedure as described for variant 1 can be used during the ABS control.

If the driver applies the brakes when driving straight ahead and turns sharply while braking with ABS, then the curve detection using the mechanism of calculating the lateral acceleration with the aid of the wheel-speed differences can fail. With the beginning of ABS control, in the known systems, the calculated lateral-acceleration value is then stored for plausibility reasons.

For this case, another detection method is selected within an ABS control.

Figure 3:
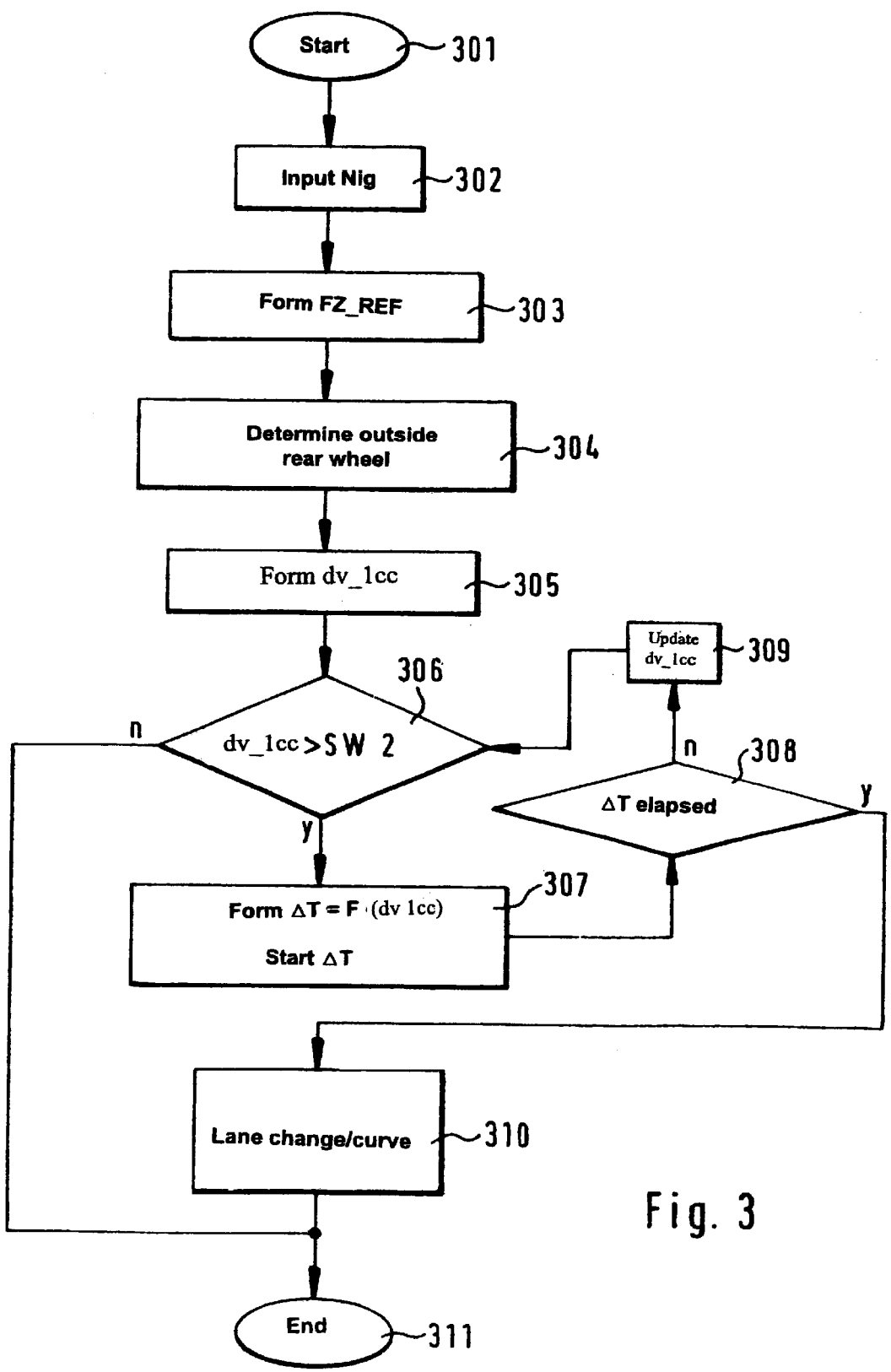
FIG. 3 shows another flow chart in accordance with the present invention.
Figure 4A:
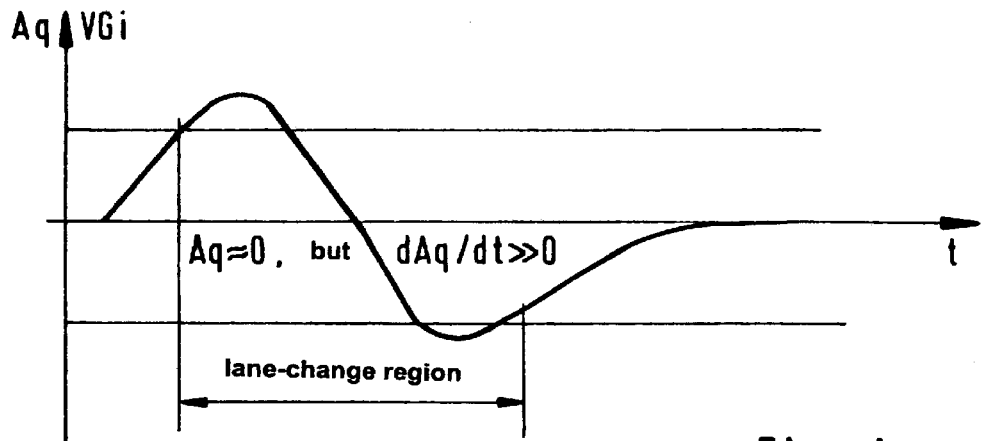
FIG. 4a shows a first illustration of a curve over time.

After start step 301 shown in FIG. 3, wheel speeds Nij are first of all input in step 302. In step 303, the vehicle reference velocity FZ_REF is formed which indicates the longitudinal vehicle velocity. This is done in a known manner as a function of wheel speeds.

In step 304, the outside rear wheel is determined. When cornering and in the select-low-control mode of the rear axle described at the outset (both rear wheels are controlled as defined by the unstable wheel), the outside rear wheel is the absolutely fastest wheel, since this wheel describes the largest circular path and thus covers the longest distance. Consequently, speed V_H$_{outside}$ of the outside rear wheel lies perceptibly above the calculated total vehicle velocity FZ_REF by the difference value dv_lcc. This difference value $$dv\_lcc = V\_H_{outside} - FZ\_REF$$

is formed in step 305.

In step 306, difference dv_lcc is compared to a threshold value SW2. If difference dv_Icc is less than value SW2, thus no lane change or cornering is detected, then there is a skip directly to final step 311.

If, however, it is determined in step 306 that the difference is sufficiently large, then in step 307, a counter is started with the time duration ΔT. Time duration ΔT is calculated beforehand as a function of the existing difference:

$$\Delta T = \text{Function (dv\_lcc)}$$

In the following step 308, it is queried whether time duration ΔT has elapsed. If this is not the case, then difference dv_lcc is updated in step 309, and step 306 is carried out once more.

If it is ascertained in step 308 that time duration ΔT has elapsed, then difference dv_lcc has assumed a large value (over SW2) sufficiently long, whereupon a lane change or a cornering is detected in step 310.

Figure 4B:
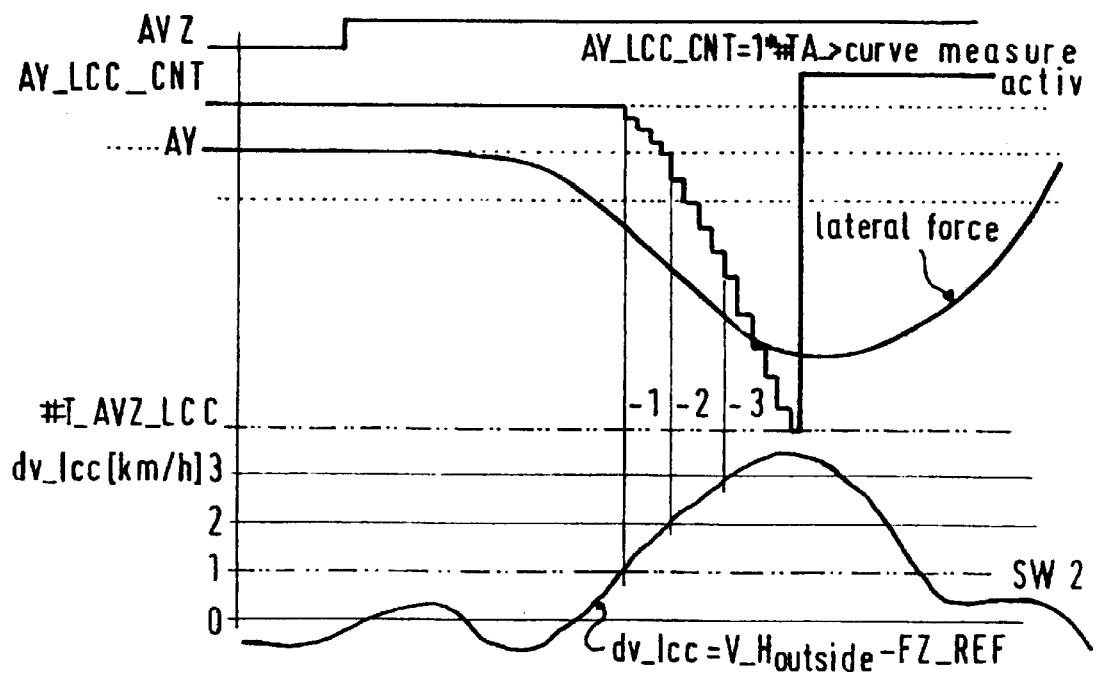
FIG. 4b shows a second illustration of curves over time.

FIG. 4b shows the implementation using a counter. Thus, the state that difference dv_lcc is sufficiently large is determined (step 306) and filtered through counter Ay_Lcc_CNT. If difference value dv_lcc exceeds threshold SW2, then counter Ay_Lcc_CNT is decremented, for example, by 1 per km/h of difference dv_lcc. If the counter reading reaches the value #T_AVZ_LCC, then a lane change or a cornering is detected ("curve measure active"). Alternatively, in response to falling below a reset value, counter Ay_Lcc_Cnt is again set back or set equal to zero.

In this context, it is unimportant whether calculations are made using km/h values or physical units such as m/s. The counting direction of counter Ay_Lcc_Cnt is established by the program and could also be implemented in the positive direction. Difference value dv_lcc is converted into the decrementing or incrementing value using the scaling factor.

The more vigorously the lane change is executed, the more the outside rear wheel lies above the total vehicle velocity, i.e. the vehicle reference FZ_REF.

The detection becomes quicker in the case of a larger difference dv_lcc between the outside rear wheel and vehicle reference FZ_REF, since the LCC counter increments by the integral value of dv_Icc. The LCC mechanism adapts to the detection probability of a lane change or of a cornering, such that:

Curve not clearly detected→time duration and therefore plausibility check longer.

Curve more clearly detected→time duration and therefore plausibility check shorter.

What is claimed is:

1. A method for detecting a lane change by a motor vehicle, comprising the steps of:

ascertaining at least one of a lateral-acceleration variable representing a lateral acceleration of the motor vehicle and a yaw variable representing a yaw velocity;

forming a change, as a function of time, in at least one of the lateral-acceleration variable and the yaw variable; and detecting the lane change when the change as a function of time exceeds a specifiable threshold value.

2. The method according to claim 1, further comprising the steps of:

determining speed variables representing rotations of at least two wheels; and determining at least one of the lateral-acceleration variable and the yaw variable as a function of the speed variables.

3. The method according to claim 1, wherein:

the motor vehicle includes an antilock control device, and the step of detecting the lane change is performed when no wheel-lock control processes are present.

4. The method according to claim 1, wherein, in response to a detection of the lane change, the method further comprises at least one of the steps of:

building up more quickly a braking pressure at an outside wheel brake than at an inside wheel brake;

increasing the braking pressure at the outside wheel brake; and preventing a yaw moment buildup delay featured within an anti-lock control device.

5. A method for detecting at least one of a curve and a lane change by a motor vehicle including at least two wheels arranged front and rear in a direction of travel, comprising the steps of:

determining speed variables representing rotations of the at least two wheels;

ascertaining a velocity variable representing a longitudinal vehicle velocity;

determining a difference between one of the speed variables corresponding to a fastest one of the at least two wheels arranged in the rear and the velocity variable; and detecting the at least one of the curve and the lane change when the difference has a specifiable, large value that exists for a time duration of a specifiable length.

6. The method according to claim 5, wherein:

the time duration is predefined as a function of the difference, and the time duration is selected to be longer in the case of a smaller magnitude for the difference than in the case of a larger magnitude for the difference.

7. The method according to claim 5, wherein:

the motor vehicle includes an antilock control device, and the step of detecting the at least one of the lane change and the curve is performed when wheel-lock control processes are present.

8. The method according to claim 5, wherein:

a braking pressure at both rear wheels is set according to a select-low-control principle, according to which a braking action at both rear wheels is regulated in accordance with an unstable one of both rear wheels.

9. The method according to claim 5, wherein:

the motor vehicle includes an antilock control device, the step of detecting the at least one of the curve and the lane change is performed when wheel-lock control processes are present, and a braking pressure at both rear wheels is set according to a select-low-control principle, according to which a braking action at both rear wheels is regulated in accordance with an unstable one of both rear wheels.

10. A device for detecting a lane change by a motor vehicle, comprising:

an arrangement for ascertaining at least one of a lateral-acceleration variable representing a lateral acceleration of the motor vehicle and a yaw variable representing a yaw velocity;

an arrangement for forming a change, as a function of time, in at least one of the lateral-acceleration variable and the yaw variable; and an arrangement for detecting the lane change when the change as a function of time exceeds a specifiable threshold value.

11. A device for detecting at least one of a curve and a lane change by a motor vehicle including at least two wheels arranged front and rear in a direction of travel, comprising:

an arrangement for determining speed variables representing rotations of the at least two wheels;

an arrangement for ascertaining a velocity variable representing a longitudinal vehicle velocity;

an arrangement for determining a difference between one of the speed variables corresponding to a fastest one of the at least two wheels arranged in the rear and the velocity variable; and an arrangement for detecting the at least one of the curve and the lane change when the difference has a specifiable, large value that exists for a time duration of a specifiable length.

12. The device according to claim 11, wherein:

the time duration is predefined as a function of the difference, and the time duration is selected to be longer in the case of a smaller magnitude for the difference than in the case of a larger magnitude for the difference.

* * * * *